United States Patent
Walther

[19]

[11] Patent Number: 5,919,020
[45] Date of Patent: Jul. 6, 1999

[54] SCREW

[76] Inventor: Uli Walther, 1812 West Riverdale Road., Thunder Bay, Ontario, Canada, P7C 4T9

[21] Appl. No.: 08/567,884

[22] Filed: Dec. 8, 1995

[30] Foreign Application Priority Data

Jan. 18, 1995 [CA] Canada ................................. 2140475

[51] Int. Cl.⁶ .............................. F16B 23/00; F16B 35/06
[52] U.S. Cl. ........................ 411/399; 411/368; 411/424; 411/919
[58] Field of Search ...................... 411/399, 411, 411/424, 426, 402, 403, 404, 919, 368

[56] References Cited

U.S. PATENT DOCUMENTS

| | | |
|---|---|---|
| 438,754 | 10/1890 | Rogers . |
| 3,236,141 | 2/1966 | Smith ................................. 411/404 X |
| 3,304,109 | 2/1967 | Schuster ............................. 411/426 X |
| 3,313,197 | 4/1967 | Knohl . |
| 3,828,422 | 8/1974 | Schmitt .................................... 29/525 |
| 3,882,752 | 5/1975 | Gutshall . |
| 3,898,706 | 8/1975 | Rivalland et al. . |
| 4,254,542 | 3/1981 | Craig .................................. 411/368 X |
| 4,572,720 | 2/1986 | Rockenfeller et al. .................. 411/387 |
| 4,586,862 | 5/1986 | Yamasaki ................................ 411/387 |
| 4,621,963 | 11/1986 | Reinwall . |
| 4,749,322 | 6/1988 | Sygnator .................................. 411/387 |
| 4,763,456 | 8/1988 | Giannuzzi ............................ 411/426 X |
| 5,141,376 | 8/1992 | Williams et al. ........................ 411/387 |
| 5,232,322 | 8/1993 | Regensburger ............................ 411/33 |
| 5,249,882 | 10/1993 | Nagoshi et al. ........................ 411/399 |

FOREIGN PATENT DOCUMENTS

| | | |
|---|---|---|
| 27387 | 9/1887 | Canada . |
| 400454 | 10/1941 | Canada . |
| 1248374 | 1/1989 | Canada . |
| 2094478 | 11/1993 | Canada . |
| 2491563 | 4/1982 | France . |
| 1500748 | 10/1969 | Germany ............................... 411/399 |
| 2228456 | 12/1973 | Germany ............................... 411/403 |
| 475002 | 10/1952 | Italy . |
| 2072781 | 8/1981 | United Kingdom . |
| 2251666 | 7/1992 | United Kingdom . |
| 2273325 | 6/1994 | United Kingdom . |

*Primary Examiner*—Neill R. Wilson
*Attorney, Agent, or Firm*—Burns, Doane, Swecker & Mathis, L.L.P.

[57] ABSTRACT

A screw, particularly a wood screw present a combination of a threaded cylindric stem (10) merging, over an inversely frustoconical part (16) with an enlarged diameter cylindric portion (20) which is integral with an underside of a large diameter washer section (23) which, in turn is integral with a shallowly convex head portion (25). The invention is intended for wood screws usually in the range of about 6 mm and provides a reduced chance of injury by providing a smooth merging with the flat surface on which the screw head is located. Also, the screw has an improved torque characteristics making it suitable for use with power screw driving tools.

9 Claims, 2 Drawing Sheets

SCREW

The present invention relates to a screw. In particular, even though not exclusively, the invention relates to a wood screw.

BACKGROUND OF THE INVENTION

1. Field of the Invention

Wood screws belong to the most widely used fasteners in many different applications. For instance, it is often required that a wood screw be capable of fixedly holding a hardware such as a hinge wing or railway clamp. Another requirement often raised is that the specific axial pressure active under the screw head of a tightened screw be as low as possible while securing a firm hold. Another requisite Is that the screw be capable of being applied without the need for countersinking the head as this requires an extra machining of at least one of the parts being joined. By the same token, it is often required that the screw positioned in place be as unobtrusive as possible on the surface to avoid the danger of injury, for instance, to animals in zoo structures, to children and to the general user.

2. Description of the Prior Art

Various types of screws are known which are directed to satisfy one or more of the above requirements. For instance, it known from Italian Patent 475002 [Manfroni] to provide a railway clamp fastening wood screw which includes a cylindric portion of the shank of the screw above the threaded portion of the shank and just below the head. The cylindric portion is closely compatible with a bore in the railway clamp through which the screw passes into the wooden tie to hold the clamp down. Viewed from the standpoint of the present invention, the screw has the drawback that the specific pressure under the screw head is relatively high and that an axially upwardly projecting portion is required for engagement with a torque applying tool, in this case a socket wrench. This type of screw therefore would be unsuitable for applications where the specific pressure must be low, the fastening force high and the surface head as flush as possible to avoid or at least substantially reduce the danger of injury to a child or an animal.

The torque tool engaging projection is known to be replaced with various cutouts compatible with tools such as screwdrivers and a variety of these exists, from plain straight grooves as in Canadian Patent 27,387 [Rogers], to more complex sockets such as shown e.g. in U.S. Pat. No. 5,249,882 [Nagoshi et al.] Canadian Patent 400,454 [Purtell], Canadian Patent 1,248,374 [Rockenfeller et al.] or Published Canadian Patent Application 2,094,478 [Goss].

Prior art screws are usually unsuitable for use with power tools, where the screw must withstand a relatively high torque while a low specific pressure under the head is required when the fastener is firmly in place. The screws having convexly shaped heads project above the surface of the workpiece often in obtrusive and potentially dangerous way which may cause injury.

SUMMARY OF THE INVENTION

It is an object of the present invention to provide a screw which would withstand a relatively high torque applied by a power tool, which would be capable, if required, to engage a predetermined size of a bore in a hardware such as a hinge wing, which could be applied, in case of a wood screw, without the need for pre-machining the surface of the workpiece to accommodate the screw head and which would, by the same token, exert a relatively small specific pressure under the head and would be of a configuration which projects from the workpiece surface in unobtrusive way, eliminating or at least substantially reducing the possibility of injury to the user of the particular workpiece.

In general terms, the invention provides a screw which comprises, in combination, a stem portion having a free end and a root end; a helical thread projecting from the surface of the stem portion; said root end being integral with and corresponding in diameter to a minor base end of a frustoconical portion projecting axially from and being coaxial with said root end; said frustoconical portion further including a major base end spaced from said minor base end, said major base end corresponding in diameter to and being integral and co-axial with a first end of a cylindric root portion; the other end of said cylindric root portion, in turn, merging with a flat annular underside of a washer section integral with and having a diameter which is a multiple of that of the second cylindric portion; said washer section including a flat, circular upper face section generally parallel with and turned away from said underside; and a centrally disposed shallowly convex head portion projecting centrally from said upper face section and generally coaxial therewith, said head portion being provided with centrally disposed drive tool engagement recess compatible with a predetermined tool for driving said screw.

The combination of the features defining the inventive screw may comprise further aspects. For instance, the root end of the stem is preferably cylindric. The helix usually extends over a major portion of the length of the stem portion. If the screw is a wood screw, the free end is pointed to facilitate its penetration into a wooden base.

The structure of the screw of the present invention will now be described in greater detail with reference to the accompanying drawings, by way of several embodiments of a wood screw. It being understood that the principles of the combined structure can be used in other types of screws or bolts.

DESCRIPTION OF THE PREFERRED EMBODIMENT

Figure 1:
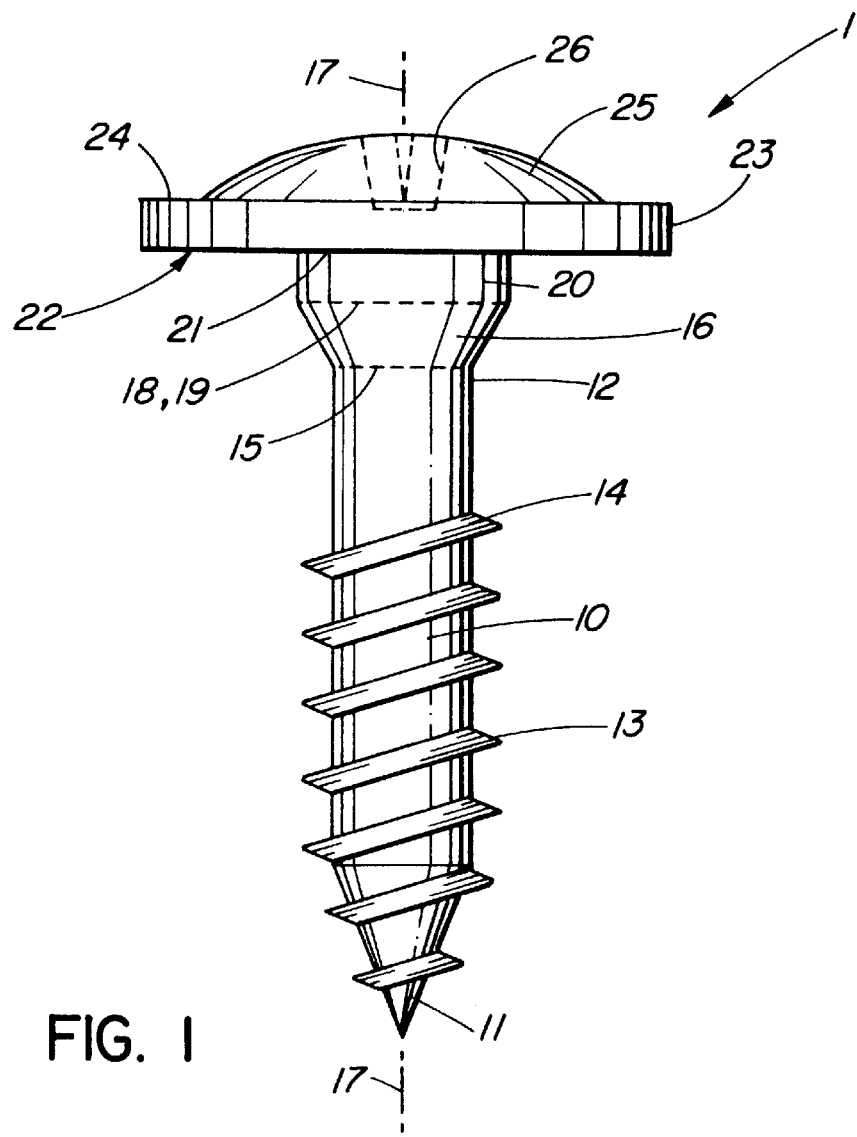
FIG. 1 is a diagrammatic, enlarged side view of a wood screw including the combination of features according to the present invention.

The screw shown in the drawings is an integral product made from suitable steel, it being understood that certain applications may warrant or require different material, for instance nylon.

The screw shown in the drawings comprises a stem portion 10. As is known, the stem portion has a free end portion 11 which, in the embodiment shown, is pointed. The opposite end of the stem 10 is designated as a root end 12. A major part of the stem portion 10 is cylindric, the only deviation being at the pointed free end 11 where the shape is conical. A helical thread 13 projects from the surface of the stem portion 10. It extends from the pointed free end 11 and terminates at a root end portion 14 of the thread 13, which is spaced from the root end 12 of the stem 10.

The root end 12 of the stem 10 is integral with a minor base end 15 of a frustoconical portion 16. The diameter of the root end 12 is the same as that of the minor base portion 15. Thus, the frustoconical portion 16 projects axially from the root end 12 and is coaxial with the root end about a common axis 17 of the screw.

The opposite end of the frustoconical portion 16 is a major base end 18. In the embodiment shown, the major base end 18 coincides with, and thus has the same diameter as a first end 19 of a root cylindric portion 20. The portions 18, 19 are integral and co-axial with the axis 17 and with each other.

The other end 21 of the root cylindric portion 20 merges with a flat annular, downwardly facing underside 22 of a washer section 23 which is integral with the cylindric portion 20. The drawings show that the diameter B1 (FIG. 4) is a multiple of that B3 (FIG. 3) of the second cylindric portion 20.

The washer section 23 defines a flat, annular upper face section 24. It is parallel with and is turned away from the underside 22.

A centrally disposed, coaxial, shallowly convex head portion 25 projects upwardly from the upper face section 24. The head portion 25 is provided with centrally disposed drive tool engagement recess 26. The particular contour in plan of the recess is shown in FIG. 5. It is to be appreciated, however, that the specific type of the recess 26 is not a part of this invention and is optional. It has to be compatible with a predetermined tool for driving the screw into a base and preferably is suitable for use with a power tool when the screw is to be used in manufacturing furniture, wooden structures or other products where power screw driving tools are required.

Figure 3:
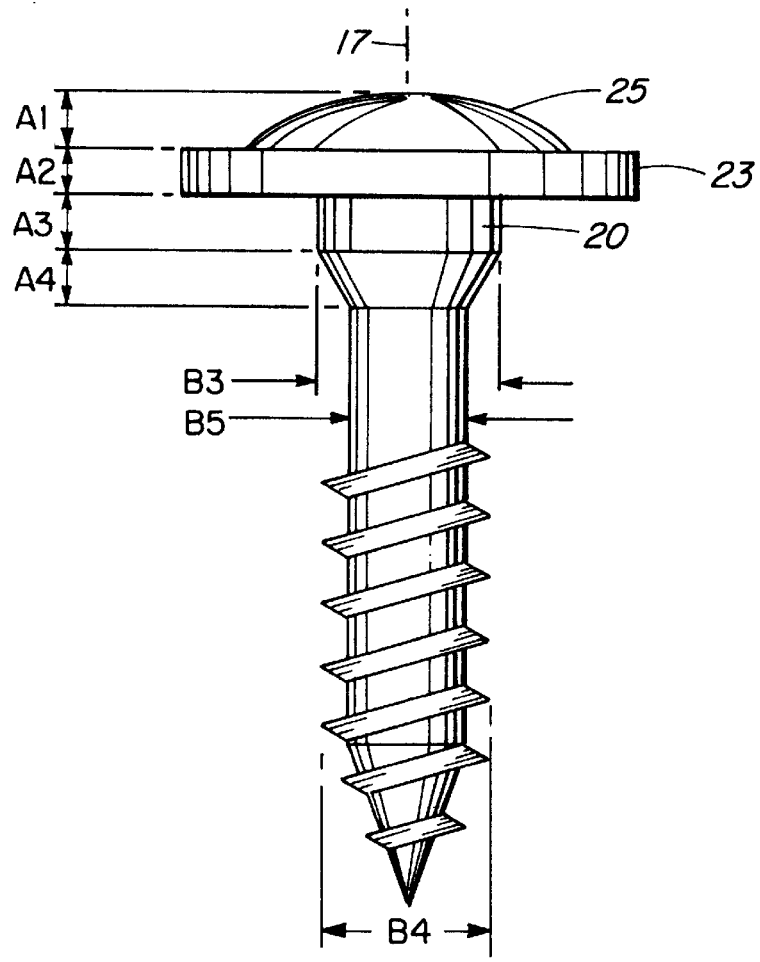
FIG. 3 is a diagrammatic side view of a screw comprising the combination of the present invention, in which certain measurements are designated to provide examples of a number of variations in size.
Figure 4:
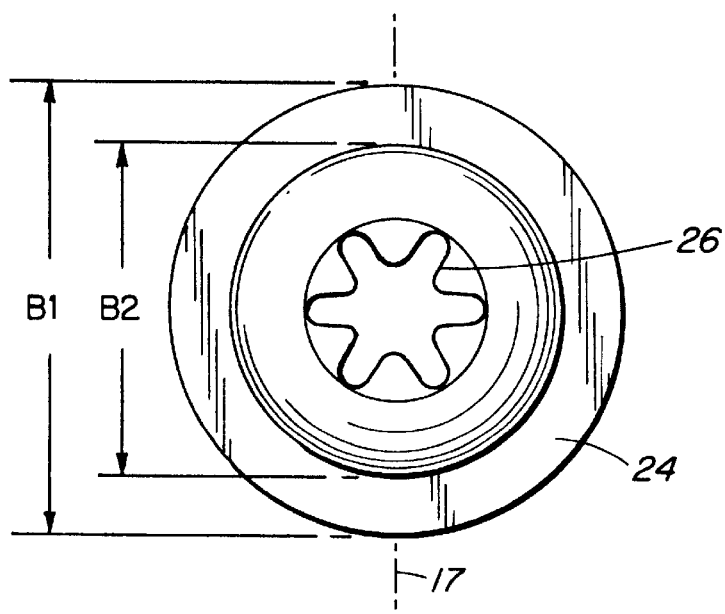
FIG. 4 is a top plan view of FIG. 3.

Reference may now be had to the examples of different measurements of the described parts of the screws as diagrammatically shown in FIGS. 3 and 4.

While certain applications may require otherwise, it is generally preferred that the axial length A3 of the root cylindric portion 20 be smaller than its diameter B3 (FIG. 4) as this arrangement facilitates the application of the screw without the need of pre-drilling a bore in the workpiece.

Another preferred feature is that while the specific diameter B2 of the head 25 is of course, smaller than the diameter B1 of the washer section 23 it is larger than the diameter B3 of the root cylindric portion 20. The latter diameter B3 may be dictated by the size of bores in hardware with which the screw is to be used, for instance a hinge wing.

The shallowly convex shape of the head portion combines with the particular physical structure of the washer section 23 to provide a relatively smooth, graduated rising of the head portion of the screw above the surface of the workpiece without sudden high corners which might cause injury, for instance to animals in zoo structures. The term "shallowly" convex used to describe the head portion 25 designates the general condition where the ratio of the axial height A1 of the head portion 25 to its diameter B2 is in the range of about 0.2 to about 0.25, in other words, the axial height of the head portion 25 above the washer section 23 is generally less than about ¼ of the diameter of the head portion 25 at the upper surface of the washer section 25. By the same token, it is preferred that the ratio of the thickness A2 of the washer section 23 to the axial height A1 of the head portion 25 be in the range of about 0.75 to about 0.9, in other words, the thickness A2 of the washer 23 smaller than the height A1 of the convex head portion 25.

With particular reference to FIGS. 3 and 4, the following Table 1 presents three examples of different embodiments of the screw of the present invention, having typical physical measurements of individual portions of the screw. The three embodiments shown are 6, 7 and 8 mm which roughly corresponds to ¼"; ⁵⁄₁₆" and ⅜" wood screws each having a total length of about 80 mm, respectively. The respective size particulars of the inventive screw, are described using reference characters of FIGS. 3 and 4.

TABLE 1

SIZE PARTICULARS OF THREE EMBODIMENTS OF THE INVENTIVE SCREW (in mm)

| Size of the screw | 8 | 7 | 6 |
|---|---|---|---|
| A1 Head 25 height | 2.4 | 2 | 1.6 |
| A2 Washer 23 thickness range | 1.8–1.5 | 1.6–1.3 | 1.4–1 |
| A3 Axial length of root cylinder 20 | 2 (max) | 2 (max) | 1.5 (max) |
| A4 Axial length of frustocon. port. 16 | 2 (max) | 2 (max) | (1.5 max) |
| B1 Diameter range of washer section 23 | 18.5–16 | 16.5–14 | 14–12.5 |
| B2 Diameter range of head portion 25 | 10.5–10 | 10–9.7 | 9–8.7 |
| B3 Diameter range of cylindric root 20 | 9.4–8.9 | 7.8–7.3 | 6.3–5.9 |
| B4 Outer dia. range of thread 13 | 8–7.5 | 7.2–6.7 | 6.2–5.7 |
| B5 Diameter range of stem portion 10 | 5.4–5.1 | 4.82–4.79 | 4.24–4.18 |

It follows from the Table 1 that a wide range of screws according to the present invention can be produced.

Figure 2:
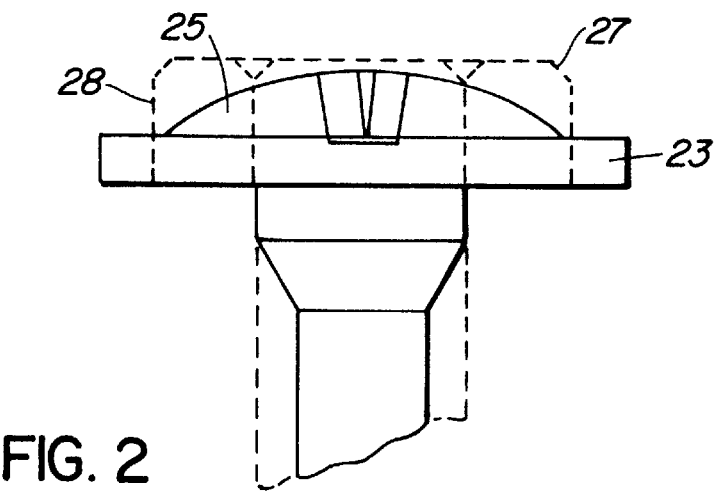
FIG. 2 is a view similar to that of FIG. 1, in which the contour of a prior art screw of comparable size, with a hexagonal head is shown in broken lines for comparison of the contour of an applied screw.

The contrast between the smoothness of the head section 23–25 of the Inventive screw and an existing screw or bolt can be appreciated upon review of FIG. 2. The broken line shows diagrammatically the contour 27 of a comparable wood screw or bolt, having the same overall height and thus strength in torque. As is known, the head 27, has a relatively high side section 28 which may give rise to injuries. Another disadvantage is in that the relatively small surface area of the underside of the head 27 may result in excessive specific pressure detrimental to the surface of a wooden workpiece and also reducing the tightness of the fastening.

It has also been established that the screw of the present invention, manufactured within the above tolerances possesses torque strength which makes it suitable for use with power screw driving tools while utilizing a drive tool engagement cavity or recess 26. It is believed that this is due to an inventive feature whereby the length of the frustoconical portion 16 generally corresponds to that of the root cylindric portion 20.

Those skilled in the art will readily appreciate that various modifications can be made to the screw of the present invention departing from the structural particulars of the embodiments described, without departing from thescope of the present invention. Accordingly, we wish to protect by letters patent which may issue on this application all such embodiments as properly fall within the scope of our contribution to the art.

I claim:

1. An integrally formed screw comprising, in combination:
(a) a stem portion having a tapering, pointed free end section and a root end;
(b) a helical thread projecting from the surface of the stem portion and extending over said tapering, pointed free end section and over at least a part of said stem portion located between said tapering, pointed, free end section and said root end;
(c) said root end being integral with and corresponding in diameter to a minor base end of a frustoconical portion projecting axially from and being coaxial with said root end;
(d) said frustoconical portion further including a major base end spaced from said minor base end, said major base end corresponding in diameter to and being coincident, integrally formed and co-axial with a first end of a cylindric root portion;

(e) said cylindric root portion further comprising a second end which is coincident with a flat annular underside of a washer section integral with and having a diameter which is a multiple of that of the second cylindric portion;

(f) said cylindric root portion defining a continuous cylindric wall extending throughout from said first end to said second end of said cylindric root portion;

(g) said washer section including a flat, annular upper face section generally parallel with and turned away from said underside; and (h) a centrally disposed shallowly convex head portion projecting from said upper face section and generally coaxial therewith, said head portion being provided with a drive tool engagement recess compatible with a predetermined tool for driving said screw.

2. The screw as recited in claim 1, wherein the root end of the stem is generally cylindric.

3. An integrally formed screw comprising, in combination:

(a) a cylindric stem portion having a tapering, pointed free end section and a root end;

(b) a helical thread projecting from the surface of the stem portion and extending over said tapering, pointed free end section and over a major part of the overall length of the stem portion located between said tapering, pointed, free end section and said root end;

(c) said root end being integrally formed with and corresponding in diameter to a minor base end of a frustoconical portion projecting axially from and being coaxial with said root end;

(d) said frustoconical portion further including a major base end spaced from said minor base end, said major base end corresponding in diameter to and being coincident, integrally formed and co-axial with a first end of a cylindric root portion;

(e) said cylindric root portion further comprising a second end which is coincident with a flat annular underside of a washer section integral with and having a diameter which is a multiple of that of the second cylindric portion;

(f) said cylindric root portion defining a continuous cylindric wall extending throughout from said first end to said second end of said cylindric root portion;

(g) said washer section including a flat, annular upper face section generally parallel with and turned away from said underside; and (h) a centrally disposed shallowly convex head portion projecting from said upper face section and generally coaxial therewith, said head portion being provided with centrally disposed drive tool engagement recess compatible with a predetermined tool for driving said screw;

(f) said washer section including a flat, circular upper face section generally parallel with and turned away from said underside; and (g) a centrally disposed shallowly convex head portion projecting from said upper face section and generally coaxial therewith, said head portion being provided with a drive tool engagement recess compatible with a predetermined tool for driving said screw.

4. An integrally formed screw comprising, in combination:

(a) a generally cylindric stem portion having a tapering, pointed free end section and a root end;

(b) a helical thread projecting from the surface of the stem portion and extending over said tapering, pointed free end section to a point spaced from said root end;

(c) said root end being integral with and corresponding in diameter to a minor base end of a frustoconical portion projecting axially from and being coaxial with said root end;

(d) said frustoconical portion further including a major base end spaced from said minor base end, said major base end corresponding in diameter to and being coincident, integrally formed and co-axial with a first end of a cylindric root portion;

(e) said cylindric root portion further comprising a second end which is coincident with a flat annular underside of a washer section integral with and having a diameter which is a multiple of that of the second cylindric portion;

(f) said cylindric root portion defining a continuous cylindric wall extending throughout from said first end to said second end of said cylindric root portion;

(g) said washer section including a flat, annular upper face section generally parallel with and turned away from said underside; and (h) a centrally disposed shallowly convex head portion projecting from said upper face section and generally coaxial therewith, said head portion being provided with a drive tool engagement recess compatible with a predetermined tool for driving said screw.

5. An integrally formed screw comprising, in combination:

(a) a generally cylindric stem portion having a tapering, pointed free end section and a root end;

(b) a helical thread projecting from the surface of the stem portion and extending over said tapering, pointed free end section to a point spaced from said root end;

(c) said root end being integral with and corresponding in diameter to a minor base end of a frustoconical portion projecting axially from and being coaxial with said root end;

(d) said frustoconical portion further including a major base end spaced from said minor base end, said major base end corresponding in diameter to and being coincident, integrally formed and co-axial with a first end of a cylindric root portion;

(e) the diameter of the root cylindric portion being larger than axial length thereof;

(f) said cylindric root portion further comprising a second end which is coincident with a flat annular underside of a washer section integral with and having a diameter which is a multiple of that of the second cylindric portion;

(f) said cylindric root portion defining a continuous cylindric wall extending throughout from said first end to said second end of said cylindric root portion;

(h) said washer section including a flat, annular upper face section generally parallel with and turned away from said underside; and (i) a centrally disposed shallowly convex head portion projecting from said upper face section and generally coaxial therewith, said head portion being provided with a drive tool engagement recess compatible with a predetermined tool for driving said screw.

6. An integrally formed screw comprising, in combination:

(a) a generally cylindric stem portion having a tapering, pointed free end section and a root end;

(b) a helical thread projecting from the surface of the stem portion and extending over said tapering, pointed free end section to a point spaced from said root end;

(c) said root end being integral with and corresponding in diameter to a minor base end of a frustoconical portion projecting axially from and being coaxial with said root end;

(d) said frustoconical portion further including a major base end spaced from said minor base end, said major base end corresponding in diameter to and being coincident, integrally formed and co-axial with a first end of a cylindric root portion;
(e) the diameter of the root cylindric portion being larger than axial length thereof;
(f) said cylindric root portion further comprising a second end which is coincident with a flat annular underside of a washer section integral with and having a diameter which is a multiple of that of the second cylindric portion;
(f) said cylindric root portion defining a continuous cylindric wall extending throughout from said first end to said second end of said cylindric root portion;
(h) said washer section including a flat, annular upper face section generally parallel with and turned away from said underside;
(i) a centrally disposed shallowly convex head portion projecting from said upper face section and generally coaxial therewith, said head portion being provided with a drive tool engagement recess compatible with a predetermined tool for driving said screw; and
(j) the diameter of said head portion being larger than that of said root cylindric portion.

7. An integrally formed screw comprising, in combination:
(a) a stem portion having a tapering, pointed, free end section and a root end;
(b) a helical thread projecting from the surface of the stem portion and extending over said tapering, pointed free end section and over at least a part of said stem portion located between said tapering, pointed, free end section and said root end;
(c) said root end being integral with and corresponding in diameter to a minor base end of a frustoconical portion projecting axially from and being coaxial with said root end;
(d) said frustoconical portion further including a major base end spaced from said minor base end, said major base end corresponding in diameter to and being coincident, integrally formed and co-axial with a first end of a cylindric root portion;
(e) said cylindric root portion further comprising a second end which is coincident with a flat annular underside of a washer section integral with and having a diameter which is a multiple of that of the second cylindric portion;
(f) said cylindric root portion defining a continuous cylindric wall extending throughout from said first end to said second end of said cylindric root portion;
(g) said washer section including a flat, annular upper face section generally parallel with and turned away from said underside;
(h) a centrally disposed shallowly convex head portion projecting from said upper face section and generally coaxial therewith, said head portion being provided with a drive tool engagement recess compatible with a predetermined tool for driving said screw; and
(i) the axial height of the head portion being greater than the thickness of the washer section as measured between said underside and said upper face section.

8. An integrally formed screw comprising, in combination:
(a) a stem portion having a tapering, pointed free end section and a root end;
(b) a helical thread projecting from the surface of the stem portion and extending over said tapering, pointed free end section and over at least a part of said stem portion located between said tapering, pointed, free end section and said root end;
(c) said root end being integral with and corresponding in diameter to a minor base end of a frustoconical portion projecting axially from and being coaxial with said root end;
(d) said frustoconical portion further including a major base end spaced from said minor base end, said major base end corresponding in diameter to and being coincident, integrally formed and co-axial with a first end of a cylindric root portion;
(e) said cylindric root portion further comprising a second end which is coincident with a flat annular underside of a washer section integral with and having a diameter which is a multiple of that of the second cylindric portion;
(f) said cylindric root portion defining a continuous cylindric wall extending throughout from said first end to said second end of said cylindric root portion;
(g) said washer section including a flat, annular upper face section generally parallel with and turned away from said underside; and
(h) a centrally disposed shallowly convex head portion projecting from said upper face section and generally coaxial therewith, said head portion being provided with a drive tool engagement recess compatible with a predetermined tool for driving said screw; and
(i) the ratio of the axial length of the head portion to the diameter thereof being in the range of about 0.15 to about 0.25.

9. An integrally formed screw comprising, in combination:
(a) a stem portion having a tapering, pointed free end section and a root end;
(b) a helical thread projecting from the surface of the stem portion and extending over said tapering, pointed free end section and over at least a part of said stem portion located between said tapering, pointed, free end section and said root end;
(c) said root end being integral with and corresponding in diameter to a minor base end of a frustoconical portion projecting axially from and being coaxial with said root end;
(d) said frustoconical portion further including a major base end spaced from said minor base end, said major base end corresponding in diameter to and being coincident, integrally formed and co-axial with a first end of a cylindric root portion;
(e) said cylindric root portion further comprising a second end which is coincident with a flat annular underside of a washer section integral with and having a diameter which is a multiple of that of the second cylindric portion;
(f) said cylindric root portion defining a continuous cylindric wall extending throughout from said first end to said second end of said cylindric root portion;
(g) said washer section including a flat, annular upper face section generally parallel with and turned away from said underside;
(h) a centrally disposed shallowly convex head portion projecting from said upper face section and generally coaxial therewith, said head portion being provided with a drive tool engagement recess compatible with a predetermined tool for driving said screw;
(i) the ratio of the axial length of the head portion to the diameter thereof being in the range of about 0.15 to about 0.25;
(j) the ratio of the thickness of said washer section to the axial length of the head portion being in the range of about 0.75 to about 0.9; and
(k) the axial length of said frustoconical portion being generally equal to the axial length of said root cylindric portion.

* * * * *